July 7, 1959 — E. J. ZOLLINGER — 2,893,558
CHAFFER SCREEN FEED FOR AGRICULTURAL COMBINE HARVESTER
Filed Aug. 14, 1957 — 2 Sheets-Sheet 1
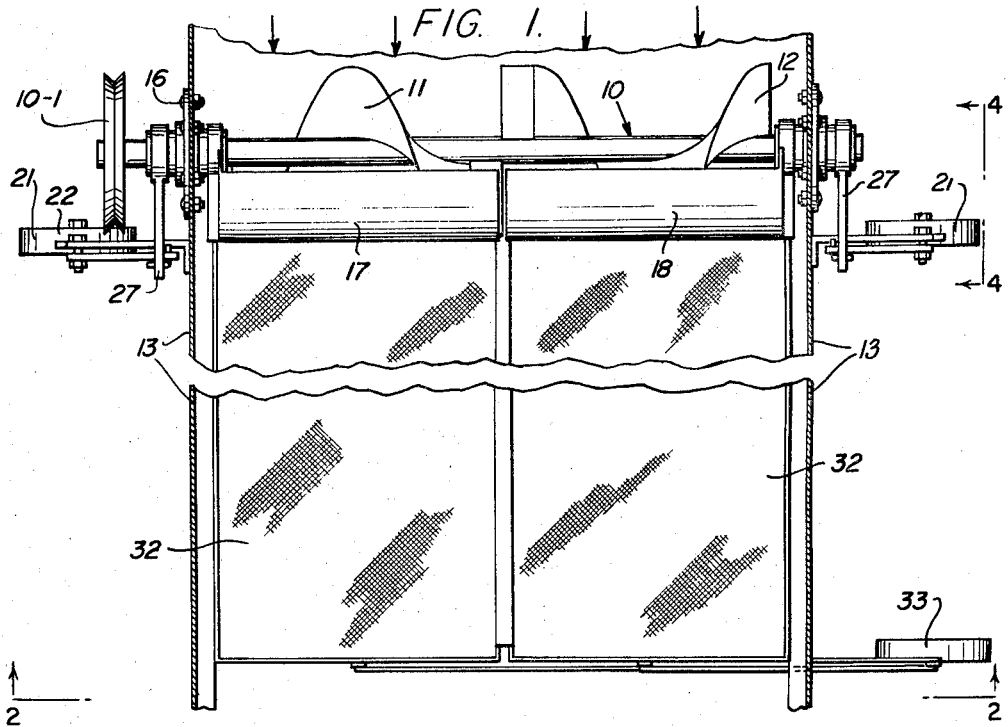
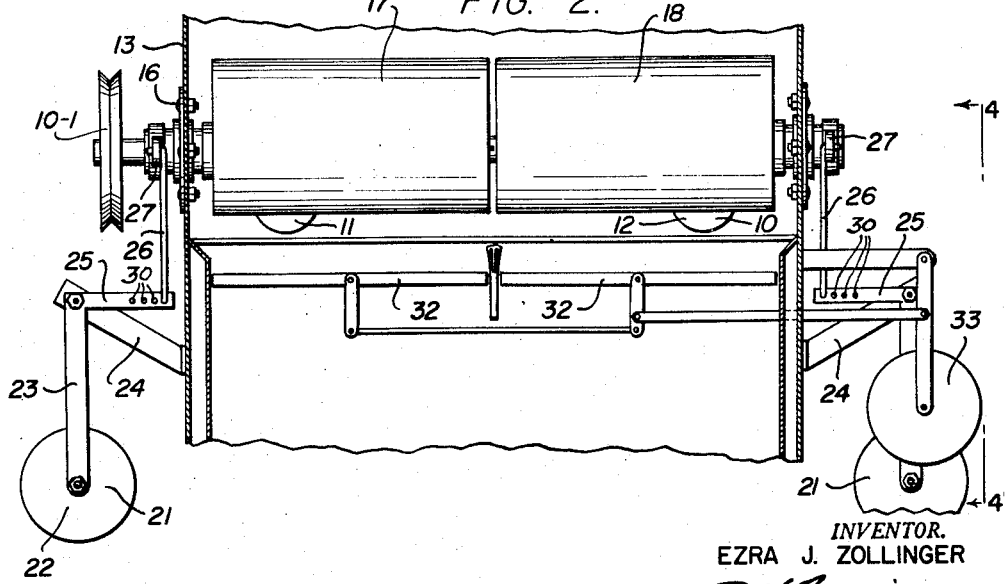
INVENTOR.
EZRA J. ZOLLINGER
ATTORNEYS

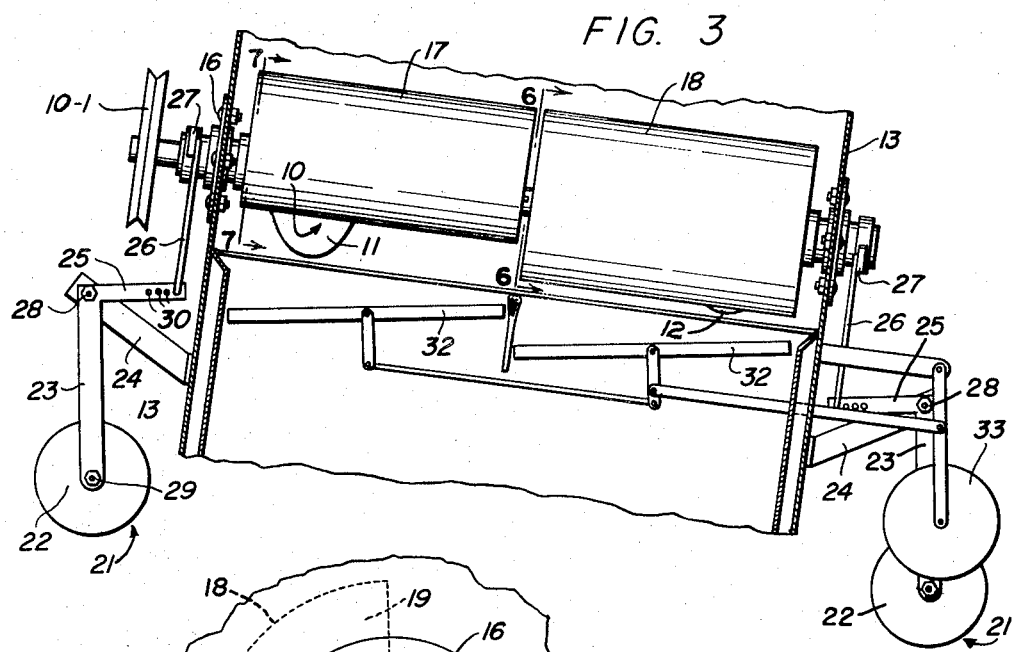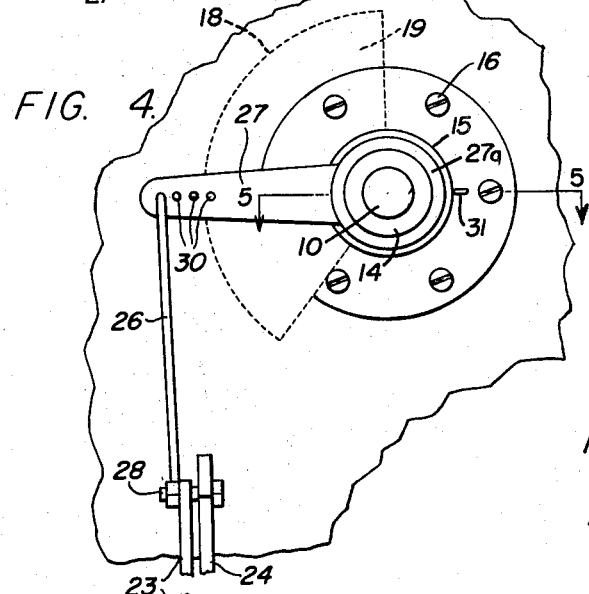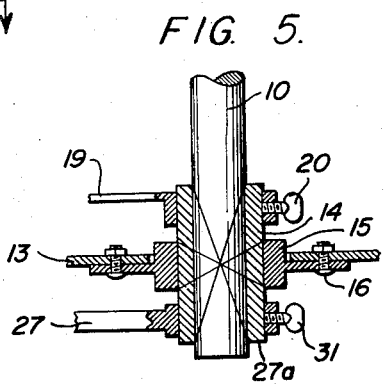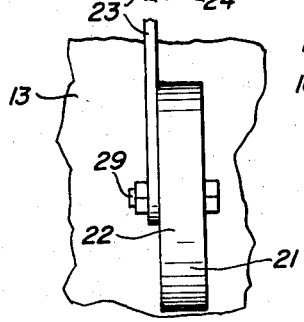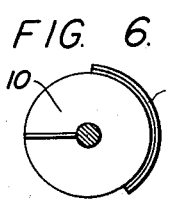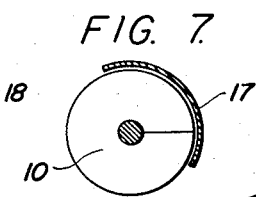
INVENTOR.
EZRA J. ZOLLINGER United States Patent Office
2,893,558
Patented July 7, 1959

2,893,558
CHAFFER SCREEN FEED FOR AGRICULTURAL COMBINE HARVESTER

Ezra J. Zollinger, Logan, Utah

Application August 14, 1957, Serial No. 678,127

10 Claims. (Cl. 209—254)

This invention relates to agricultural combine harvesters adapted for hillside operation, and is concerned with providing a combine harvester having grain distributing means interposed between the conventional threshing cylinder and grain-cleaning shoe or chaffer screen thereof, for enabling recovering of grain in an efficient manner when operating on sloping terrain.

Conventional combines, which perform satisfactorily in flat farm areas, operate at considerably reduced efficiency when used on sloping terrain such as is found in many of the dry farm areas of the western part of the United States. This is due to the fact that, while traversing a hillside, the machine slants sideways. As a result, the grain and chaff mixture being conveyed from the threshing cylinder to the chaffer screen tends to accumulate at the low side of the machine, and there is not the usual even feed of such mixture across the width of the chaffer screen. Under these conditions, the screen is largely ineffective for its intended purpose.

Various ways of distributing the grain and chaff mixture transversely of the chaffer screen, despite the slant of the machine, have already been developed. Thus, laterally directed streams of air from appropriately positioned nozzles have been utilized under pendulum control to blow grain and chaff from the low side of the machine to the high side at the feed end of the chaffer screen. Again, a chaffer screen of special concave configuration has been employed, and, in another instance, the chaffer screen has been divided into longitudinal sections and each section mounted for pendulum controlled, transverse movement about a longitudinal axis to achieve automatic leveling thereof regardless of machine slope.

One of the most positive approaches to the problem has been the provision of a single flight, screw-type conveyer extending transversely across the feed end of the chaffer screen, such conveyer having a pitch which is controlled in both magnitude and direction by a pendulum mechanism. In operation, the pitch of the conveyer varies in accordance with the tilting of the combine, so as to convey in an appropriate manner the grain and chaff mixture toward the high end of the chaffer screen.

While the positive operation of a screw conveyer makes its use advantageous, the necessity of providing a trough for it to work in involves undue expense and special structural considerations for the combine itself. Moreover, with the particular screw conveyer mentioned above, when the conveyer flight is in the neutral, vertical position imposed as the combine operates on level ground, feed of the grain and chaff mixture to the chaffer screen is only nominal. Also, a variable pitch screw conveyer is expensive to manufacture and is likely to require frequent repairs.

A principal object of this invention is to provide a construction utilizing a screw conveyer, but eliminating the above-noted difficulties.

A particular object is to provide for optimum feeding of the chaffer screen of a combine when such combine is operated on sloping terrain, and for substantially normal feeding thereof when the combine is operated on level ground.

Another object is to provide a chaffer screen feed device which can be quickly and easily installed in most standard makes of combines, without extensive structural alterations thereof, to adapt them for hillside operation.

In accordance with the invention, selectively movable baffles are employed in combination with a conveying screw, to contain the grain against forward travel and constrain it to travel longitudinally with the screw, thereby providing, in effect, reaction means for such conveyer screw in the performance of its conveying function. The conveyer screw has mutually reverse flights extending along respective half-portions of its length, and the baffles are selectively movable into and out of reaction positions by suitable control means responsive to the sideward slant of the combine as it travels through a field. Thus, mixed grain and chaff piled up at the low side of the machine in advance of the chaffer screen is conveyed by the screw from such low side to the middle of the chaffer screen at the feed end thereof, where it passes through the device of the invention by reason of the normal feeding action of the machine.

Additional objects and features of the invention will become apparent from the following detailed description of the presently preferred embodiment illustrated in the accompanying drawings.

In the drawings:

Fig. 1 represents a fragmentary horizontal section through a typical installation of the invention in a standard combine harvester on level ground, the section being taken above the chaffer screen or grain-cleaning shoe thereof so as to illustrate the inventive structure in top plan, portions of the chaffer screen being broken away for convenience of illustration, and the direction of travel of material being indicated by arrows;

Fig. 2, a transverse section taken along the line 2—2 of Fig. 1;

Fig. 3, a view corresponding to that of Fig. 2, but showing the structure as it appears when the combine is tilted to one side when traveling on sloping ground;

Fig. 4, a fragmentary side elevation from the standpoint of the line 4—4 in Fig. 1 and drawn to a considerably enlarged scale;

Fig. 5, a detail view showing a fragmentary longitudinal section taken along the line 5—5 in Fig. 4;

Fig. 6, a fragmentary transverse section taken along the line 6—6 in Fig. 3; and Fig. 7, a corresponding view taken along the line 7—7 in Fig. 3.

Referring now to the drawings:

The agricultural combine harvester partially illustrated is a standard type in which the device of the invention has been installed. As is conventional, a mixture of grain and chaff is fed in the direction of the arrows, Fig. 1, from the threshing cylinder (not shown) toward the feed end of the grain-cleaning shoe or chaffer screen 32 by some type of conveyance means (also not shown) which usually takes different forms in different models of combines.

Regardless of the particular type of conveyance means used to transport the grain and chaff mixture from the threshing cylinder to the chaffer screen, the inventive structure is disposed at the feed end of the schaffer screen.

The inventive structure comprises, in essence, a screw conveyor 10 and a pair of pendulum-controlled baffles 17 and 18.

Conveyor 10 is provided with mutually reverse flights 11 and 12 along opposite half-portions of its length. It is journaled at each end in combine housing 13, preferably by means of a bearing sleeve 14, Fig. 5, and a bearing 15 for each bearing sleeve, the bearing 15 being secured in place by bolts 16. It should be noted that by means of such reverse flights, conveyor 10 discharges centrally of its length when rotated in the proper direction by drive means (not shown) belted to pulley 10—1. Thus, the respective flights operate to convey mixed grain and chaff toward the center of the conveyer.

In this illustrated embodiment, baffles 17 and 18 are arcuate in configuration, preferably having the axis of 10 as a center. Each is provided with an end web 19, Figs. 4 and 5, which is adjustably mounted on a corresponding one of the sleeves 14, being normally fixed in position by means of a thumb screw 20, Fig. 5.

Rotational displacement of the respective baffles 17 and 18 about the axis of rotation of conveyor screw 10 is produced by gravity operated pendulums 21. While the mechanism by which such pendulums accomplish their purpose is largely conventional, yet, for sake of clarity of discussion, their component parts and operation of same will be given in some detail.

Each pendulum mechanism 21 includes a pendulum bob 22, a pendulum arm 23, a support arm 24 (affixed to combine housing 13 by means of welding, for example), a pendulum arm extension 25, a link 26, and a control arm 27. Pendulum arm 23 and pendulum arm extension 25, as shown, form portions of a unitary stamped part (see Fig. 3). A pivot attachment 28 mounts the pendulum arm and extension on support arm 24. Attachments 29 affix pendulum bob 22 to pendulum arm 23. Pendulum arm extension 25 and control arm 27 are each provided with a plurality of linkage adjustment apertures 30, which accommodate the appropriate placement of link 26. Control arm 27 in Fig. 4 is also provided with a mounting ring portion 27a, Figs. 4 and 5, which fits over sleeve 14 and is adjustably secured thereto by means of a thumb screw 31.

Figs. 1 and 2 show the pendulum mechanisms 21 in their normal positions, i.e., when the combine is being operated on level ground. Under these circumstances baffles 17 and 18 are positioned in non-reaction relationship with screw 10, as shown in Figs. 1 and 2, and the grain and chaff mixture travels directly onto screen 32 without being diverted transversely by screw 10.

When, however, the combine slants to the right on sloping terrain, as shown in Fig. 3, the pendulum to the left undergoes rotational displacement about its pivot axis in a counterclockwise direction. This motion of the pendulum causes a corresponding rotation of its control arm 27 to effect an upward rotational displacement of baffle 17 as indicated in Fig. 3, while corresponding motion of the pendulum at the right effects a downward rotational displacement of baffle 18, also as indicated in Fig. 3.

Reference is made to Fig. 5 to show that each of the baffles 17 and 18 is securely and rigidly coupled to its corresponding control arm 27 by means of its end web 19, bearing sleeve 14, and thumb screws 20 and 31.

When the combine slants oppositely, the actions of the pendulums are similar, but in reverse directions, effecting raising of baffle 18 and lowering of baffle 17.

This means that, in addition to preventing a major portion of the grain and chaff mixture from passing directly to the chaffer screen 32, the baffle that has been lowered into reaction position operates as a working surface for the low half of the conveyor screw, so as to cause most grain and chaff accumulating toward the low side of the machine to be transported upwardly to the high half of the conveyor screw, there to be conveyed directly toward and onto the chaffer screen through the open passage provided by the raised baffle.

In this embodiment of the invention, a sectional chaffer screen of the self-leveling type aforementioned is utilized. Self-leveling is accomplished by pendulum means 33, which is largely conventional—see particularly Bozarth United States Patent No. 2,500,448.

From the above, it can be seen that the present invention provides a grain-distributing device for combines which effectively compensates for undesirable accumulations of grain and chaff at the low side of the machine in advance of the chaffer screen when the combine is being operated on sloping terrain. In this connection, it should be borne in mind that the linkage component of pendulums 21 may be adjusted by appropriate selection of holes 30 to effect a degree of closing and opening of the baffles relative to their respective portions of the screw conveyor as will best handle the particular conditions of hillside operation encountered in any given operation.

It is ordinarily undesirable to adjust the mechanism so that the low baffle closes completely, for some feed along the entire width of any type of chaffer screen is usually desirable. However, when the chaffer screen is of the conventional unitary type, a greater degree of closing of the low baffle is advantageous.

The provision of a sectional, self-leveling, chaffer screen in combination with the grain and chaff feed device, as here specifically illustrated, is especially desirable. Such combination produces unusually effective results, in that the grain and chaff may be fed to the screen in greater quantity at the low ends than with the conventional screen. In other words, the adjustment is desirably such that the lower baffle opens wider than it does when the conventional screen is utilized.

Whereas this invention is here illustrated and described with respect to a certain preferred form of the apparatus concerned, it is to be understood that various changes therein and various other structural arrangements may be made by those skilled in the art without departing from the scope of the claims which here follow.

I claim:

1. In a combine harvester having a chaffer screen for receiving a flow of mixed grain and chaff, a grain-distributing feed device positioned adjacent the feed end of said chaffer screen, said grain-distributing feed device comprising a conveyor screw extending transversely of the chaffer screen along said feed end thereof and having mutually reverse flights extending along opposite end portions thereof; baffle means extending along said screw and normally positioned in non-cooperative relationship therewith, but having opposite end portions respectively positionable in cooperative relationship therewith between said screw and the chaffer screen and along that conveyor screw end portion which is lowermost when the combine slants sideways, so as to restrain forward flow of mixed grain and chaff from such lowermost portion of the conveyer screw and render it operative to convey the restrained grain and chaff upwardly along said lowermost end portions of the screw to the normally positioned, non-cooperative end portion of said baffle means; and means responsive to the slope of the combine for selectively positioning said opposite end portions of the baffle means.

2. A grain-distributing device according to claim 1, wherein the baffle means comprises a pair of baffles associated with respective half-portions of the length of said conveyor screw; and wherein the baffle positioning means comprises mechanism associated with the respective baffles for moving one or the other of said baffles from normal, non-cooperative position relative to the conveyer screw to cooperative position, and vice versa, depending upon the direction of slope of the combine.

3. A grain-distributing device according to claim 2, wherein each of the baffles is of arcuate configuration about the screw conveyer axis as a center, and is mounted for rotational displacement about said axis under the influence of the baffle positioning means.

4. A grain-distributing device according to claim 3, wherein the baffle positioning means includes a pendulum for each baffle and linkage operably interconnecting the pendulum with the baffle.

5. A grain-distributing device according to claim 4, wherein the linkage is adjustable to vary the extent of positioning of the lowermost baffle into cooperative relationship with the lowermost portion of the length of the conveyer.

6. In a combine harvester adapted for hillside operation, the combination of a sectional, self-leveling chaffer screen; a conveyer screw extending transversely of the chaffer screen along said feed end and having mutually reverse flights extending along respective half-portions of its length; baffle means associated with said screw and normally positioned in non-cooperative relationship therewith, but having opposite end portions respectively positionable in cooperative relationship therewith between it and the chaffer screen along that conveyer screw end portion which is lowermost when the combine slants sideways, so as to interfere with forward flow of mixed grain and chaff from such lowermost portion of the conveyer screw and render the latter operative to convey grain and chaff upwardly along said conveyer; and means responsive to the slope of the combine for selectively positioning said opposite end portions of the baffle means in one or the other of said normal and said cooperative positions thereof.

7. A grain-distributing device according to claim 6, wherein the baffle positioning means includes a pendulum for each baffle and linkage operably interconnecting the pendulum with the baffle.

8. A grain-distributing device according to claim 7, wherein the linkage is adjustable to vary the extent of positioning of the lowermost baffle into cooperative relationship with the lowermost portion of the length of the conveyer.

9. A grain-distributing device for attachment to a combine harvester to adapt it for hillside operation, comprising a conveyer screw having mutually reverse flights extending along respective half-portions of its length; a pair of baffles associated with said half-portions of the length of the conveyer screw, respectively; means mounting said baffles for mutually independent movement into and out of cooperative positions relative to their respective half-portions of the length of the conveyer screw; and means responsive to the longitudinal slope of said conveyer screw for moving the baffle associated with the lowermost half-portion thereof into cooperative position.

10. In a combine harvester having a chaffer screen for receiving a flow of mixed grain and chaff, a grain-distributing feed device positioned adjacent the feed end of said chaffer screen, said grain-distributing feed device comprising conveyer screw means extending transversely of the chaffer screen along said feed end thereof and having mutually reverse flights extending along opposite end portions thereof; baffle means extending along said screw means and normally positioned in non-cooperative relationship therewith, but having opposite end portions respectively positionable in cooperative relationship therewith between said screw means and the chaffer screen and along that conveyer screw means end portion which is lowermost when the combine slants sideways, so as to restrain forward flow of mixed grain and chaff from such lowermost portion of the conveyer screw means and render it operative to convey the restrained grain and chaff upwardly along said lowermost end portion of the screw means to the normally positioned, non-cooperative end portion of said baffle means; and means responsive to the slope of the combine for selectively positioning said opposite end portions of the baffle means.

References Cited in the file of this patent

UNITED STATES PATENTS

| 1,202,376 | Fraser | Oct. 24, 1916 |
| 1,229,812 | Sturtevant | June 12, 1917 |
| 1,737,818 | Welty | Dec. 3, 1929 |
| 2,310,610 | Bissell | Feb. 9, 1943 |